United States Patent
Naik

(10) Patent No.: US 6,666,493 B1
(45) Date of Patent: Dec. 23, 2003

(54) AUTOMATIC SUN VISOR AND SOLAR SHADE SYSTEM FOR VEHICLES

(75) Inventor: Sanjeev Manubhai Naik, Troy, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/324,588

(22) Filed: Dec. 19, 2002

(51) Int. Cl.[7] .................................................. B60J 3/00
(52) U.S. Cl. ..................... 296/97.4; 296/97.8; 296/97.4
(58) Field of Search ............................. 296/97.4, 97.8, 296/97.2, 97.6, 97.9, 97.5; 362/492, 490, 144; 250/203.4, 201.1; 359/272

(56) References Cited

U.S. PATENT DOCUMENTS

| | | | |
|---|---|---|---|
| 4,874,938 A | * 10/1989 | Chuang | 250/203.4 |
| 5,042,866 A | * 8/1991 | Cody | 296/97.4 |
| 5,301,736 A | * 4/1994 | Wu | 296/97.8 |
| 5,472,255 A | * 12/1995 | Moore | 296/97.8 |
| 5,530,572 A | * 6/1996 | He | 250/201.1 |
| 5,764,402 A | * 6/1998 | Thomas et al. | 359/272 |
| 5,838,482 A | * 11/1998 | Decroupet et al. | 359/272 |
| 5,873,621 A | * 2/1999 | Kuighadush et al. | 296/97.8 |
| 5,947,544 A | * 9/1999 | Hubeshi | 296/97.4 |
| 5,954,386 A | * 9/1999 | Thomas | 296/97.2 |
| 6,056,424 A | * 5/2000 | DiNunzio | 362/490 |
| 6,131,987 A | * 10/2000 | Rossiter | 296/97.2 |
| 6,450,560 B1 | * 9/2002 | Sturt et al. | 296/97.4 |

FOREIGN PATENT DOCUMENTS

| | | | |
|---|---|---|---|
| JP | 55 68422 | * | 5/1980 |
| JP | 60 261725 | * | 12/1985 |
| JP | 62 50222 | * | 3/1987 |
| JP | 11 34662 | * | 2/1999 |

OTHER PUBLICATIONS

"Electrochromic Materials", Electrochromic Glazings: How they Work.
"Nanocrystalline Electrochromic Devices", Nanocrystalline Electrochromic Devices, pp. 1–4.
"How Electrochromic Windows Work", Electrochromic Windows Research, pp. 1–4.

* cited by examiner

Primary Examiner—Kiran Patel
(74) Attorney, Agent, or Firm—Kathryn A. Marra

(57) ABSTRACT

An automatic sun visor system for a vehicle includes a light detecting apparatus for detecting sunlight incident upon the face of an occupant of the vehicle. A microcontroller receives a control signal from the light detecting apparatus, and an adjustable sun visor receives a darkening control signal from the microcontroller. The darkening control signal activates the adjustable sun visor in response to the degree of sunlight detected.

11 Claims, 6 Drawing Sheets

AUTOMATIC SUN VISOR AND SOLAR SHADE SYSTEM FOR VEHICLES

BACKGROUND

The present disclosure relates generally to sunlight blocking devices and, more particularly, to a self-adjusting, automatic sun visor and solar shade system for vehicles that determines the blocking needs of an individual driver.

One traditional way of shading a driver's eyes from sunlight is through a manually operated sun visor attached to the interior headliner of a vehicle. The sun visor may be manually folded downward and positioned to shield the driver's eyes from sunlight shining in through the front windshield. Typically, the sun visor may also pivot with respect to the longitudinal axis of the vehicle so that the driver can use the visor to block sunlight that is shining in the driver side door window. In either case, however, the driver must manually position the visor. Moreover, a manual visor does not function to block out sunlight shining through the vehicle's passenger side front windshield or side door. Thus, in order to shade out the light from that area, a driver has to manually position the passenger side sun visor.

Mechanically activated sun visor devices have also been developed. One such device includes a motorized sun visor that can be activated and positioned by the driver pressing an actuator button. The visor itself is made of material that is rolled onto a drum that is connected to a motor. Depending on the commands inputted by the driver, the motor causes the visor material to be unrolled or rolled up. With such a system, however, there is no way of automatically positioning the sun visor based on the quantity of light contacting the driver's eyes. In addition, the system does not provide a way of blocking sunlight that is entering through the driver or passenger side windows of the vehicle.

Still another device that has been developed describes an electronically controlled visor that uses liquid crystal pixels configured inside of the window to shade out sunlight. The visor is activated by a light sensor that detects the angle and incidence of light. When the pixels are activated they will shade out some of the light while still allowing the visor to be transparent.

SUMMARY

In an exemplary embodiment, an automatic sun visor system for a vehicle includes a light detecting apparatus for detecting sunlight incident upon the face of an occupant of the vehicle. A microcontroller receives a control signal from the light detecting apparatus, and an adjustable sun visor receives a darkening control signal from the microcontroller. The darkening control signal activates the adjustable sun visor in response to the degree of sunlight detected.

In another embodiment, an automatic sun visor system for a vehicle includes at least one infrared camera aimed toward the headrest of the driver's seat of the vehicle. A microcontroller is connected to the at least one infrared camera, and a first sun visor is connected to the microcontroller. The first sun visor is capable of shading light shining in through the driver side of the front windshield. In addition, a second sun visor is connected to the microcontroller, and is capable of shading light shining in through the passenger side of the front windshield.

In still another embodiment, a method for automatically operating a vehicle sun visor includes detecting the amount of light shining through the windows of the vehicle and onto the face of a vehicle occupant. The detected amount of light is compared to a desired reference amount, and a control signal is applied to adjust the vehicle sun visor such that the actual amount of light incident onto the face of the vehicle occupant is in agreement with the desired reference amount of light.

BRIEF DESCRIPTION OF THE DRAWINGS

Referring to the exemplary drawings wherein like elements are numbered alike in the several Figures.

DETAILED DESCRIPTION

Figure 1A:
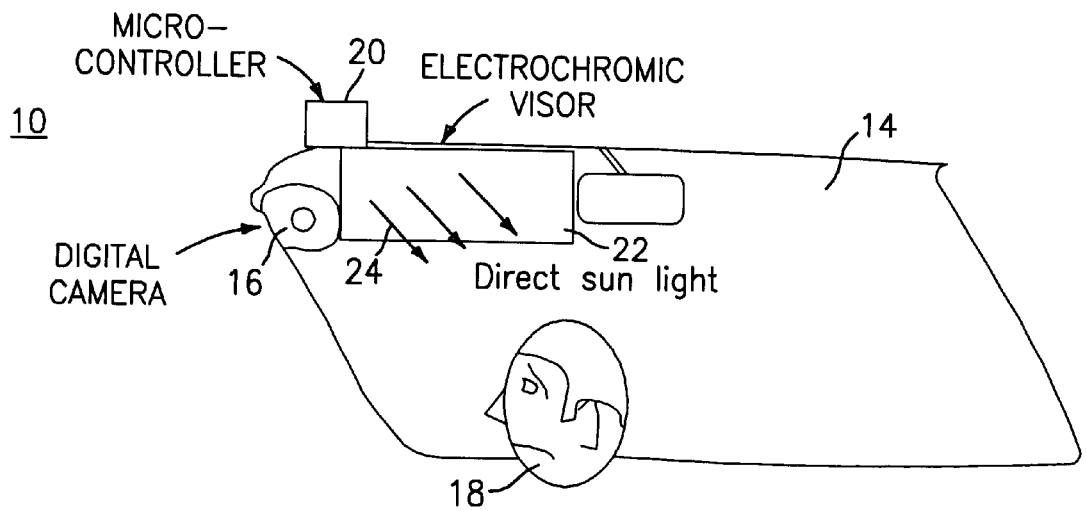
FIGS. 1(a) and 1(b) illustrate a schematic diagram of a vehicular sun visor system, in accordance with an embodiment of the invention.
Figure 1B:
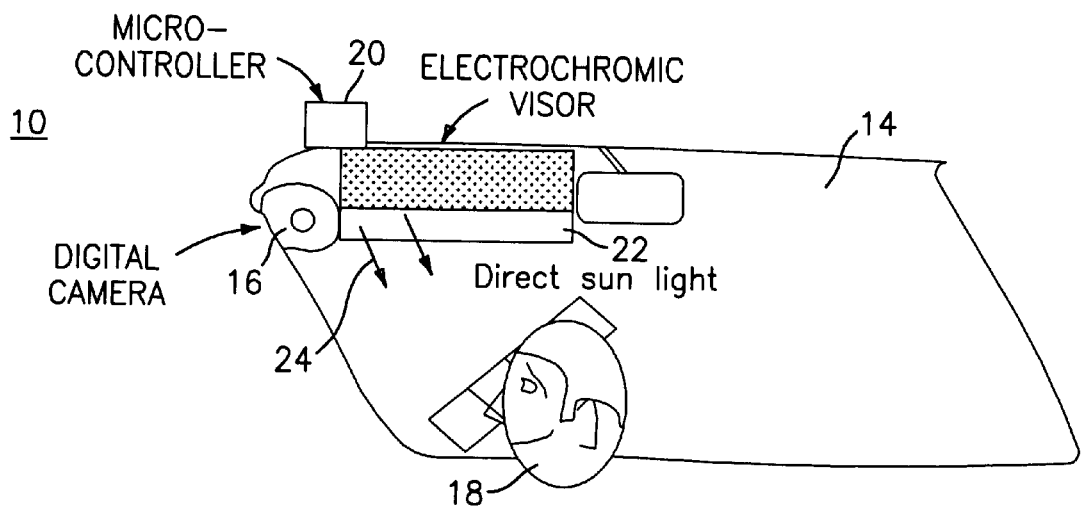

Referring initially to FIGS. 1(a) and 1(b), there is shown a schematic diagram of one embodiment of a vehicular sun visor system 10. The sun visor system 10 includes a digital camera 16 that faces inward toward the face 18 of the driver of a vehicle (not shown). The digital camera 16 is connected to and sends a video signal to a microcontroller 20. The microcontroller 20 is in turn connected to an electrochromic visor 22 that is placed across the surface of the front windshield 14 of the vehicle.

As is well known in the art, an electrochromatic device is one in which a reversible color change of a material is caused by the application of an electrical current or potential. The electrochromic visor 22 may rest against the surface of windshield 14, or it may be formed inside of windshield 14. When a predetermined amount of sunlight 24 shines through windshield 14 or other windows of the vehicle, the digital camera 16 signals the microcontroller 20 to activate electrochromic visor 22 to respond by shading out a portion of the sunlight 24 shining in windshield 14 of the vehicle.

It should be noted that the electrochromic visor 22 is but one example of a device that may be used to carry out the darkening/shading function in response to detected sunlight. For example, a liquid crystal device or other device responsive to electrical current may be used to provide darkening. In addition, an electrically operated, motor driven shading apparatus may also be used to provide the desired shading, as will be explained in greater detail hereinafter.

Figure 2:
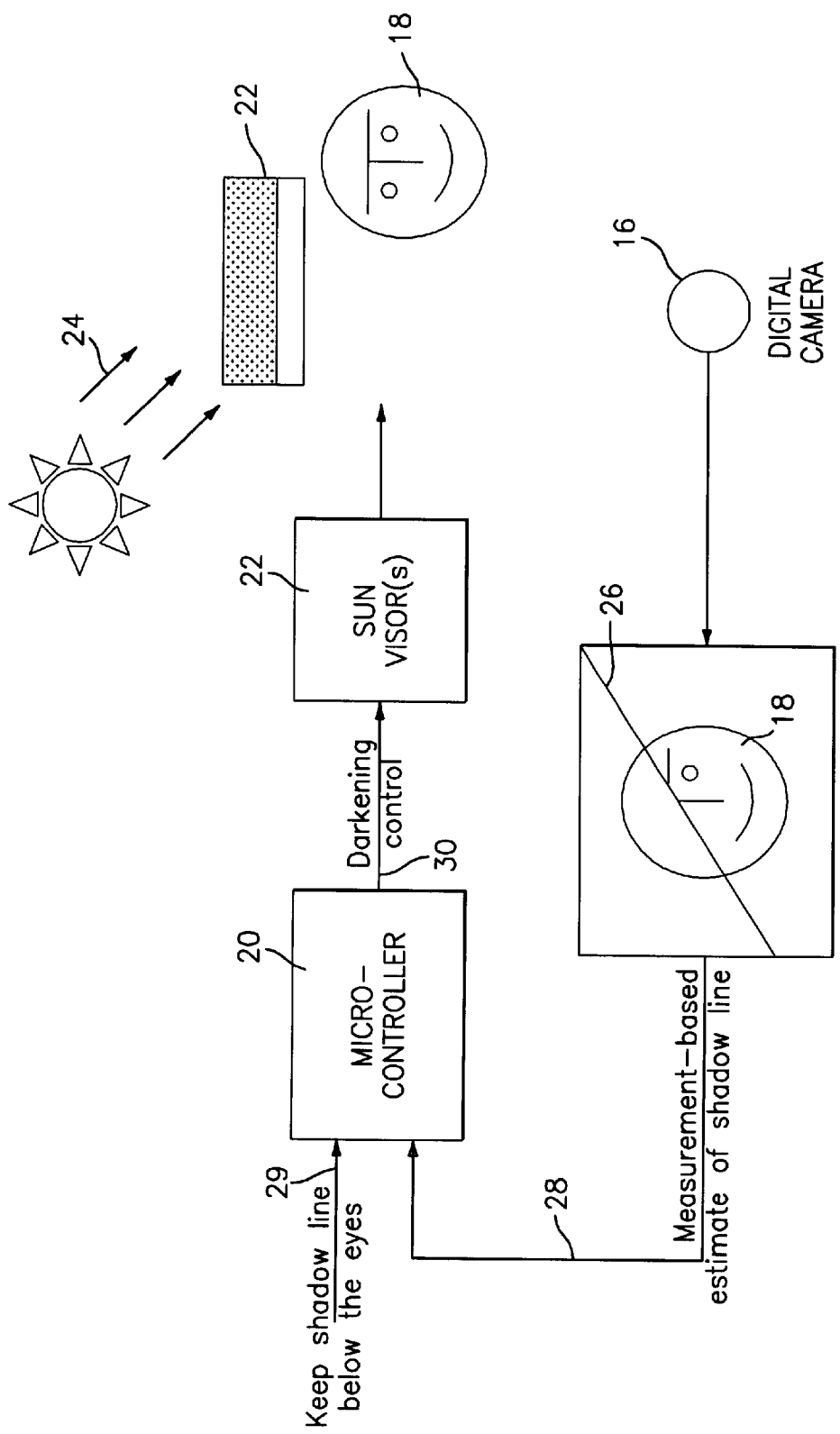
FIG. 2 is a schematic block diagram of the sun visor system of FIG. 1.

FIG. 2 is a block diagram illustrating a particular method of sunlight detection and activation of the sun visor system 10 of FIG. 1. Like elements of the system 10 shown in FIG. 1 are similarly designated in FIG. 2. Again, the digital camera 16 is pointed toward the face 18 of the driver of the vehicle. Specifically, the digital camera 16 detects the amount of sunlight 24 reaching the driver's face 18 as defined by shadow line 26. The readings taken by the digital camera 16 are provided to the microcontroller 20 by a control signal 28, which may be representative of a measurement-based estimate of the shadow line 26 across the driver's face 18. The microcontroller 20 compares the control signal 28 with a reference shadow line signal 29 intended to keep the shadow line 24 below the driver's eyes. Thus, if a designated amount of sunlight 24 reaches the driver's face 18 the electrochromic visor 22 is activated by a darkening control signal 30 sent from microcontroller 20. The darkening control signal 30 causes the shading intensity of the visor 22 to be increased or decreased, based upon on measurements of the shadow line 26 on driver's face 18.

Figure 3:
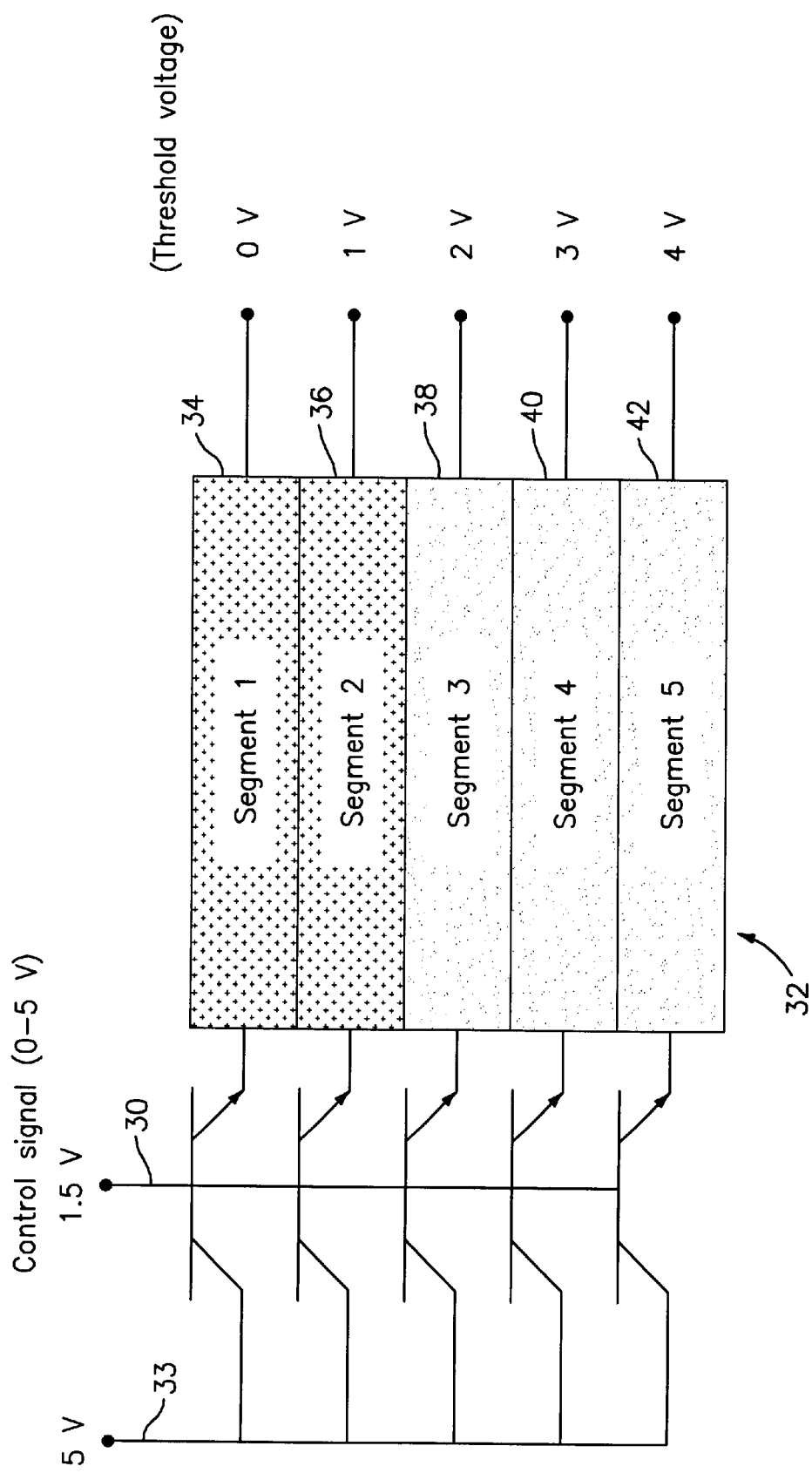
FIG. 3 is a schematic diagram illustrating the operation of an electrochromic embodiment of the sun visor system.

FIG. 3 is a schematic diagram illustrating the operation of the electrochromic sun visor 22 shown in FIGS. 1 and 2. In this particular embodiment, the electrochromic sun visor 22 is depicted as having a series of five horizontally disposed panels 32 arranged adjacent to each other in a vertically stacked fashion. It will be appreciated, however, that the electrochromic sun visor 22 can also be arranged to have a different number of horizontal panels 32. The panels 32 could also be arranged in a different spatial orientation (e.g., vertical or circular panels), depending on factors such as the direction of light or the placement of the electrochromic visor 22 on other windows in the vehicle. Each panel 32 (designated individually as segment 1 through segment 5) is coupled to a supply voltage 33 through a corresponding transistor 35.

The switching of each transistor is controlled through the darkening control signal 30. However, beginning from the top segment (segment 1), the corresponding transistor coupled to each successive segment has a progressively higher threshold voltage. Thus configured, the specific magnitude of the darkening control signal 30 (which may range, for example, between 0 volts (V) and 5 V), will determine how may panels 32, if any, of the electrochromic sun visor 22 are darkened.

Accordingly, the first horizontal panel 34 (segment 1) is coupled to a corresponding transistor having threshold voltage of just greater than 0 V, the second horizontal panel 36 (segment 2) is coupled to a corresponding transistor having threshold voltage of just greater than 1 V, the third horizontal panel 38 (segment 3) is coupled to a corresponding transistor having threshold voltage of just greater than 2 V, the fourth horizontal panel 40 (segment 4) is coupled to a corresponding transistor having threshold voltage of just greater than 3 V, and the fifth horizontal panel 42 (segment 5) is coupled to a corresponding transistor having threshold voltage of just greater than 4 V. In the example illustrated, the value of the control signal is 1.5 V. Because this exceeds the threshold value of the transistors coupled to segments 1 and 2, those segments are darkened. However, since the threshold value of the transistors coupled to the remaining segments is greater than 2.0 V, the segments are not darkened. If the value of the darkening control signal 30 were to subsequently be increased to 2.5 volts, for example, then segment 3 would also become darkened.

When any of the five panels 32 of electrochromic visor 22 are darkened, they will still be translucent. This allows the driver to still be able to see through the visor 22 while, at the same time, bright sunshine is shaded out. Although FIG. 3 shows the five panels 32 as having either a dark, shaded mode or a clear, unshaded mode it should be understood that it is possible to utilize an electrochromic visor 22 that has one or more intermediate ranges of shading for such applications as shading out less intense light such as sunlight on cloudy days, or shading out bright headlights that are encountered at night.

Figure 4:
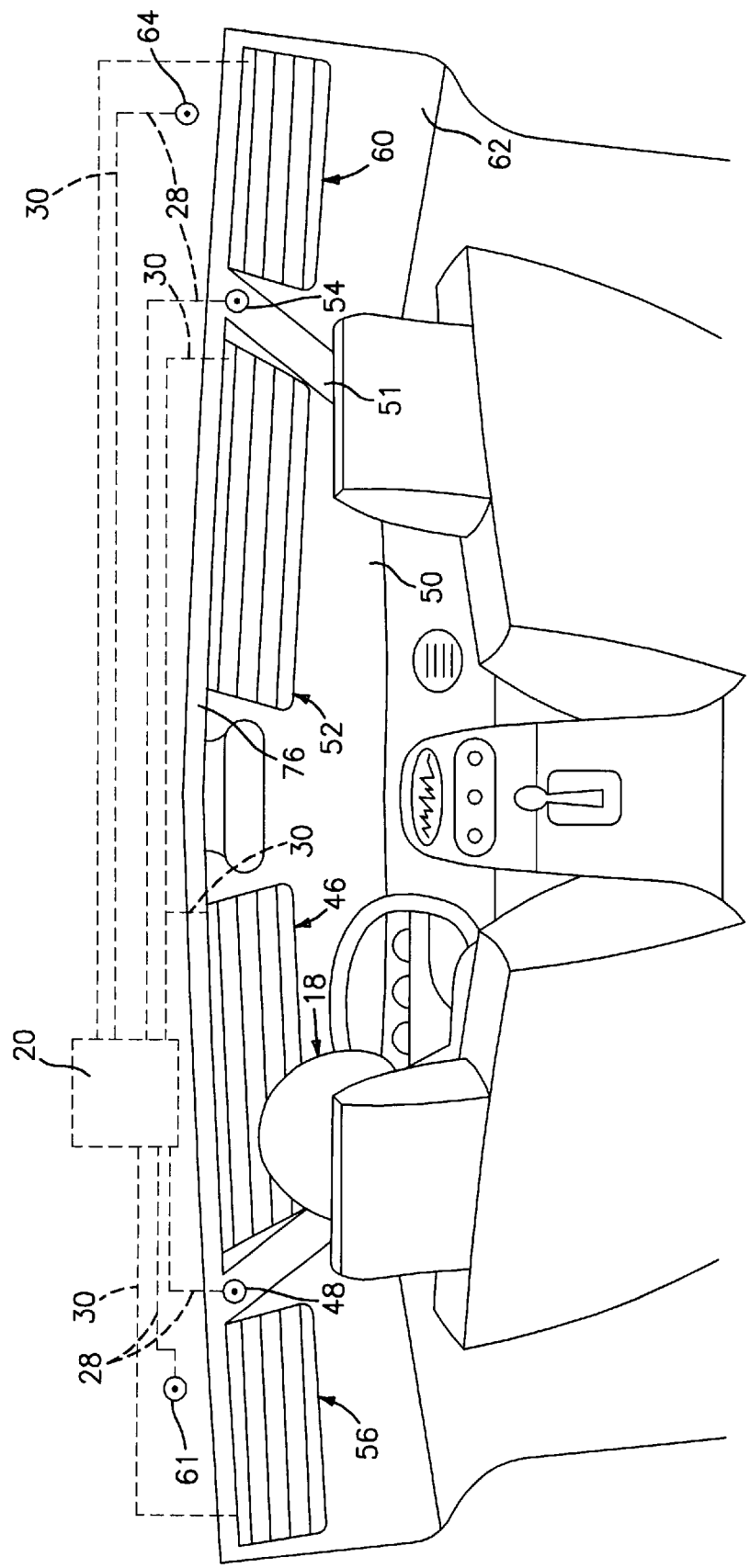
FIG. 4 is a perspective view of the electrochromic sun visor embodiment implemented in a motor vehicle.

Referring now to FIG. 4, there is shown a perspective view of another electrochromic embodiment of the vehicular sun visor system 10 arranged within the interior of a motor vehicle. As is shown, the system 10 includes four individual electrochromic sun visors that darken in response to heat readings on the driver's face 18 taken with four individual infrared cameras. A driver side front windshield visor 46 is mounted to a front windshield 50. Associated therewith is driver side front windshield camera 48 mounted to the driver side I-pillar 51 located adjacent to the front windshield 50. Camera 48 is configured to receive heat readings that will activate or deactivate the driver side front windshield visor 46.

Similarly, a passenger side front windshield visor 52 is mounted to front windshield 50, and is associated with a passenger side front windshield camera 54 mounted to the passenger side I-pillar located adjacent to the front windshield 50. Camera 54 is configured to receive heat readings that will activate or deactivate passenger side front windshield visor 52. In addition, a driver side window visor 56 (mounted to a driver side window 58) and a passenger side window visor 60 (mounted to a passenger side window 62) are associated with a driver side window camera 61 (mounted to a headliner 76 above the driver side window 58) and a passenger side window camera 64 (mounted to a headliner above the passenger side window 62), respectively.

Each of the four infrared cameras 48, 54, 61, and 64 sends corresponding control signals 28 to a microcontroller 20. In this illustrative embodiment, the microcontroller 20 is depicted as being positioned inside of headliner 76 of the vehicle. However, the microcontroller 20 could also be positioned in other areas of the vehicle interior such as in the instrument panel or in the side door housing of the vehicle, depending on the spatial availability of a particular vehicle model. In response to the heat signals from infrared cameras 48, 54, 61, and 64, the microcontroller 20 may transmit an appropriate darkening control signal 30 to one or more of the electrochromic visors 46, 52, 56, and 60. Of course, subsequent adjustments to the shading of the electrochromic visors 46, 52, 56, and 60 are made whenever new heat signals 28 are sent to the microcontroller 20.

While this particular embodiment incorporates only one microcontroller, it is possible to use more than one microcontroller based on the individual needs of a particular application. For instance, it may be the case that better results are achieved using more than one microcontroller in order to have more control over which electrochromic visors are darkened. It may also prove to be more cost effective to incorporate more than one microcontroller as opposed to having just one main microcontroller.

Figure 5:
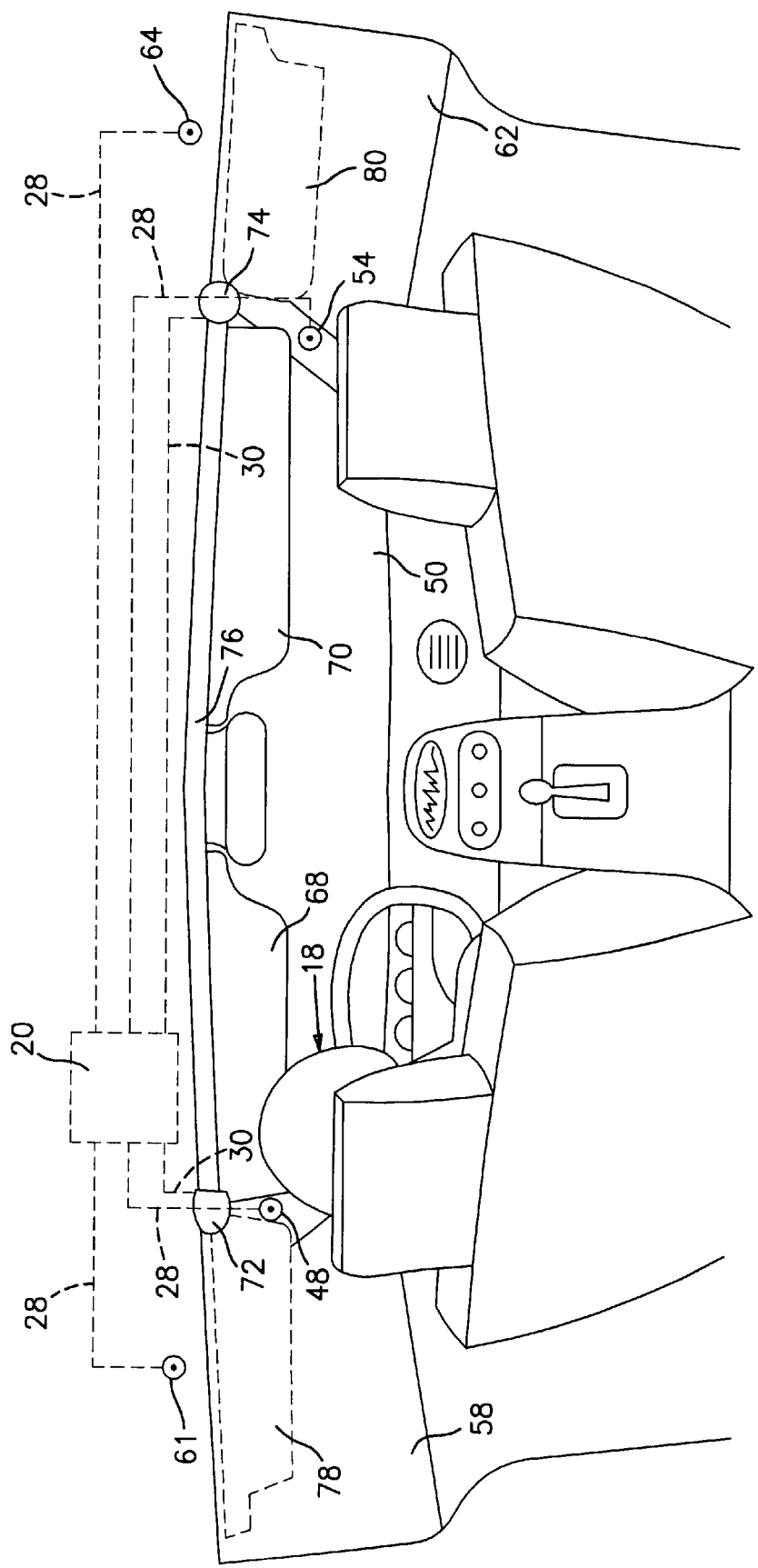
FIG. 5 is a perspective view of a mechanical fold down embodiment of the sun visor system.

FIG. 5 is a perspective view of a mechanical fold down embodiment of the vehicular sun visor system 10 arranged within the interior of a motor vehicle, in which like elements appearing in FIG. 5 are designated with the same reference numerals as in the previous figures. In addition, the particular method of sending heat signals 28 from infrared cameras 48, 54, 61, and 64 to microcontroller 20 in the illustrated embodiment, as well as sending a control signal 30 from microcontroller 20 to a particular visor is the same as described in FIG. 4. However, instead of electrochromic visors, the embodiment of FIG. 5 implements a pair of motorized fold down sun visors.

The pair of motorized fold down sun visors includes a driver side visor 68 and a passenger side visor 70. The driver side visor 68 is movably coupled to an electrically operated motor 72 mounted to headliner 76, while the passenger side visor 70 is movably coupled to an electrically operated motor 74 mounted to headliner 76. Both the driver side visor 68 and the passenger side visor 70 are generally opaque so as to prevent light from passing through.

Specifically, the motors 72, 74 are configured to receive a darkening control signal 30 from microcontroller 20 as a control input thereto, and are responsible for folding down visors 68, 70 from a resting position against the headliner 76 to a shading position in front of the interior side of front windshield 50. In addition, the motors 72, 74 can also cause visors 68, 70 to pivot and translate to a second blocking position 78, 80 that is depicted in FIG. 5 as a ghost outline. When the visors 68, 70 are in their respective second blocking positions 78, 80, sunlight is prevented from coming in through the driver side and passenger side windows 58, 62. The particular fold angle of visors 68, 70 may be adjusted through control signals issued by the microcontroller 20. The adjustment of the fold angle of visors 68, 70 will accordingly change the position of the shadow line, which is detected with either infrared or digital cameras, directed at the face of the driver.

Figure 6:
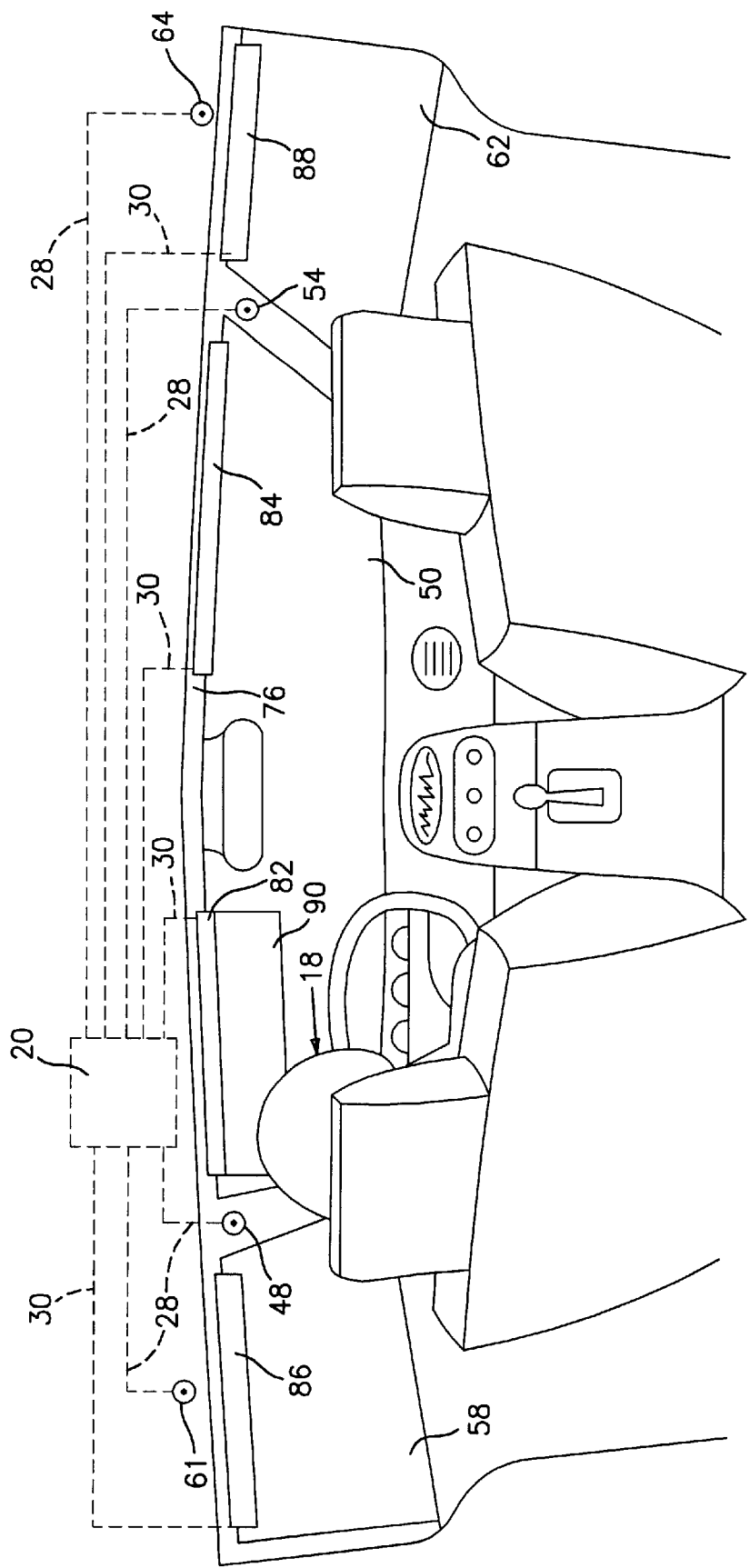
FIG. 6 is a perspective view of a mechanical roll down embodiment of the sun visor system.

Finally, FIG. 6 is a perspective view of a mechanical roll down embodiment of the vehicular sun visor system 10 arranged within the interior of a motor vehicle, in which like elements appearing in FIG. 6 are designated with the same reference numerals as in the previous figures. Once again, the particular method of sending heat signals 28 from infrared cameras 48, 54, 61, and 64 to microcontroller 20 in the illustrated embodiment, as well as sending a control signal 30 from microcontroller 20 to a particular visor is the same as described in FIGS. 4 and 5. However, instead of electrochromic visors or a mechanical fold visors, the embodiment of FIG. 6 implements a pair of motorized roll down sun visors.

The pair of motorized roll down sun visors includes a driver side windshield roll down visor 82, a passenger side windshield roll down visor 84, driver side window roll down visor 86, and a passenger side window roll down visor 88. Each of the visors includes a motorized drum (not shown) having a shade 90 rolled thereupon. Each shade 90 is also preferably constructed of a generally opaque material suitable for blocking out light. The mounting of each roll down visor is similar to that shown for the fold down visors of FIG. 5. Moreover, the roll down embodiment also includes cameras for each visor that detect heat or light incident upon the driver's face, so as to generate an appropriate signal to the microcontroller 20.

The four infrared cameras 48, 54, 61, 64 depicted in the embodiments of FIGS. 4–6 are positioned such that they view the driver's face 18 at an angle that is relative to the angle of incident light in order to enable each of the visors to block light. Although the embodiments described above use four infrared cameras, it is also possible to use a lesser number of cameras. For example, imaging software can analyze the angle and intensity of light reaching the driver's face such that the system can determine the proper visor position to activate. It is also possible to control the degree of shading needed based on the heat readings taken using the infrared cameras. Additionally, such applications will enable the system to be used to shade any sunlight present on cloudy days, or light generated by the oncoming headlights of other vehicles. Although each of the visor arrangements in FIGS. 4–6 depict using a specific number of visors, it is also contemplated that the system could provide desired sun blocking coverage by using a lesser or greater number of visors.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An automatic sun visor system for a vehicle, comprising:
    a light detecting apparatus for detecting sunlight incident upon the face of an occupant of the vehicle;
    a microcontroller for receiving a control signal from said light detecting apparatus; and
    an adjustable sun visor, said sun visor receiving a darkening control signal from said microcontroller;
    wherein said darkening control signal activates said adjustable sun visor in response to the degree of said sunlight detected.

2. The system of claim 1, wherein said adjustable sun visor further comprises an electrochromic sun visor, said electrochromic sun visor having a plurality of individual panels capable of dynamically controlling sunlight transmission therethrough.

3. The system of claim 2, wherein:
    said plurality of individual panels are arranged in a generally vertical fashion with respect to one another; and
    each of said individual panels are associated with a corresponding switching transistor operated through said darkening control signal;
    wherein each successive switching transistor from one end to another has a progressively higher threshold voltage.

4. The system of claim 1, wherein said light detecting apparatus further comprises a camera, said camera being positioned toward the face of the occupant.

5. The system of claim 4, wherein said camera is an infrared camera.

6. The system of claim 4, wherein said camera detects a shadow line across the face of the occupant.

7. An automatic sun visor system for a vehicle, comprising:
    at least one infrared camera aimed toward the headrest of the driver's seat of the vehicle;
    a microcontroller connected to said at least one infrared camera;
    a first sun visor connected to said microcontroller, whereby said first sun visor is capable of shading light shining in through the driver side of said front windshield; and
    a second sun visor connected to said microcontroller, whereby said second sun visor is capable of shading light shining in through the passenger side of said front windshield.

8. The system of claim 7, wherein said at least one infrared camera is a digital camera.

9. The system of claim 7, further comprising:
    a third sun visor to shade light shining in through said driver side window, whereby said third sun visor is connected to said microcontroller; and
    a fourth sun visor displaced on the interior surface of a passenger side window to shade light shining in through said passenger side window, whereby said fourth sun visor is connected to said microcontroller.

10. The system of claim 9 wherein each of said first, second, third and fourth sun visors are electrochromic visors having a plurality of individual panels capable of dynamically controlling sunlight transmission therethrough.

11. The system of claim 10, wherein:

said plurality of individual panels are arranged in a generally vertical fashion with respect to one another; and each of said individual panels are associated with a corresponding switching transistor operated through a darkening control signal from said microprocessor;

wherein each successive switching transistor from one end to another has a progressively higher threshold voltage.

* * * * *